INVENTOR
GEORGE W. HIPPISLEY JR.
BY Richard J. Donahue
ATTORNEY

July 8, 1969 G. W. HIPPISLEY, JR 3,454,935

HIGH-SPEED DUAL-RANK FLIP-FLOP

Filed June 28, 1966 Sheet 2 of 3

INVENTOR
GEORGE W. HIPPISLEY JR.
BY Richard J. Donahue
ATTORNEY

July 8, 1969 G. W. HIPPISLEY, JR 3,454,935

HIGH-SPEED DUAL-RANK FLIP-FLOP

Filed June 28, 1966 Sheet 3 of 3

INVENTOR
GEORGE W. HIPPISLEY JR.

BY Richard J. Donahue

ATTORNEY

United States Patent Office 3,454,935
Patented July 8, 1969

3,454,935

HIGH-SPEED DUAL-RANK FLIP-FLOP

George W. Hippisley, Jr., Natick, Mass., assignor to Honeywell Inc., Minneapolis, Minn., a corporation of Delaware Filed June 28, 1966, Ser. No. 561,259
Int. Cl. H03k *286, 295, 19/08*
U.S. Cl. 340—172.5 10 Claims

ABSTRACT OF THE DISCLOSURE

A dual-rank flip-flop having master and slave data storage sections. The master section is asymmetrically constructed, thus eliminating the need for complementary data input signals. Gating structure is provided within the slave section which permits the simultaneous activation of its cross-coupled inverter switches while assuredly preventing the formation of a race condition within the flip-flop.

The present invention relates in general to electronic data processing apparatus and in particular to a high-speed, bistable circuit useful in such apparatus.

A basic logic circuit essential to the operation of computers and related electronic data processing apparatus is the so-called flip-flop, a bistable device which will store incoming digital data. Fundamentally, such flip-flop circuits are patterned after the well-known Eccles-Jordan circuit configuration in that they include a pair of electronic switches having cross-coupled signal feedback paths therebetween such that when one switch is rendered conductive, it holds the other in its non-conductive condition and vice versa. The complementary bilevel signals formed by the switches are indicative of the binary state of the flip-flop.

The present invention is directed to an improved version of a more sophisticated form of flip-flop, circuit, called the dual-rank flip-flop. The dual-rank flip-flop, useful in synchronously operated data processing apparatus, includes a pair of bistable signal storage sections, commonly termed the master and slave sections. The master section is adapted to process binary data applied to its gate input terminals and is switched to a binary state in accordance with such data during the first part of a timing, or clock cycle. During the second part of the clock cycle, the complementary output signals of the master section are transferred to the slave section, whereupon the slave section assumes a related bistable state and provides a pair of high-power complementary output signals capable of driving associated output circuitry.

While presently-known dual-rank flip-flops are decidedly superior in operation to their single-stage predecessors, they nevertheless are incapable of reliable performance at the operational speeds now demanded for data processing apparatus. This is the case since the cross-coupled bistable transistor switches of the slave section, being heavily loaded by associated output circuitry, each require a considerable time to assume a new conductive condition. In addition, the complementary transistor switches are not activated and deactivated simultaneously, but rather sequentially, such that the time required to establish a new stable state within the slave section is the cumulative time required for the initially-activated transistor switch to assume its new conductive condition, provide a feedback signal which will initiate the converse switching of the complementary transistor switch, and for the latter to assume its new conductive condition.

Thus far, attempts to simultaneously activate the slave section transistor switches have been largely unsuccessful. Various clocking and gating schemes have been employed in an attempt to solve this problem. The resulting circuits have been unacceptably slow in operation, complex, expensive and subject to a potential race condition whereby the circuits are permitted to inadvertently assume the wrong stable state.

It is therefore the primary object of the present invention to provide a bistable circuit of the type described which is not subject to the foregoing disadvantages.

It is another object of the present invention to provide a dual-rank flip-flop of the type described which is capable of operating at speeds faster than heretofore possible.

It is a further object of the present invention to provide a high-speed, dual-rank flip-flop which is not subject to a race condition.

In modern-day computer technology, the advantages of constructing transistorized circuits on a single chip or wafer of semiconductor material are well recognized. Such monolithic circuits require less space and less operating power, and in addition can be produced in vast quantities at a low per unit cost.

It is therefore yet another object of the present invention to provide a circuit of the type described which can be constructed in monolithic form on a seminconductor wafer mounted within a standard microelectronic package.

Conventional dual-rank flip-flop circuits are symmetrically constructed and require a pair of complementary logic signals from each data input source to effect a change of state of the flip-flop. In instances where the number of available data input terminals to the flip-flop is restricted, as may be the case if the device is contained within a standard microelectronic package, the necessity for providing complementary pairs of data input signals severely limits the logical power of the circuit. If the flip-flop can be operated with but one logic signal from each data source, the number of different combinations of logic signals that can be coupled to the flip-flop, and processed thereby, is greatly increased.

It is therefore an additional object of the present invention to provide an asymmetrical, monolithic high-speed, dual-rank flip-flop circuit.

The foregoing objects are attained in a dual-rank flip-flop circuit having a master and a slave section, the master section being asymmetrically constructed such that its input gating structure requires but one logic signal from each data source for its operation. It is an important feature of the invention to provide gating structure within the slave section of the flip-flop which permits the simultaneous activation of its inverter switches, to cause the latter to rapidly assume a new stable condition. Moreover, the novel gating structure within the slave section of the flip-flop assuredly prevents the formation of a race condition at the resulting increased speed of operation of the circuit. In a preferred form of the present invention, the foregoing circuit is advantageously constructed on a monolithic semiconductor wafer mounted within a standard 14 terminal microelectronic package.

The foregoing objects and features of novelty which characterize the invention, as well as other objects of the invention, are pointed out with particularity in the claims annexed to and forming a part of the present specification. For a better understanding of the invention, its advantages and specific objects thereof, reference should be had to the following detailed description and the accompanying drawings in which:

Figure 1:
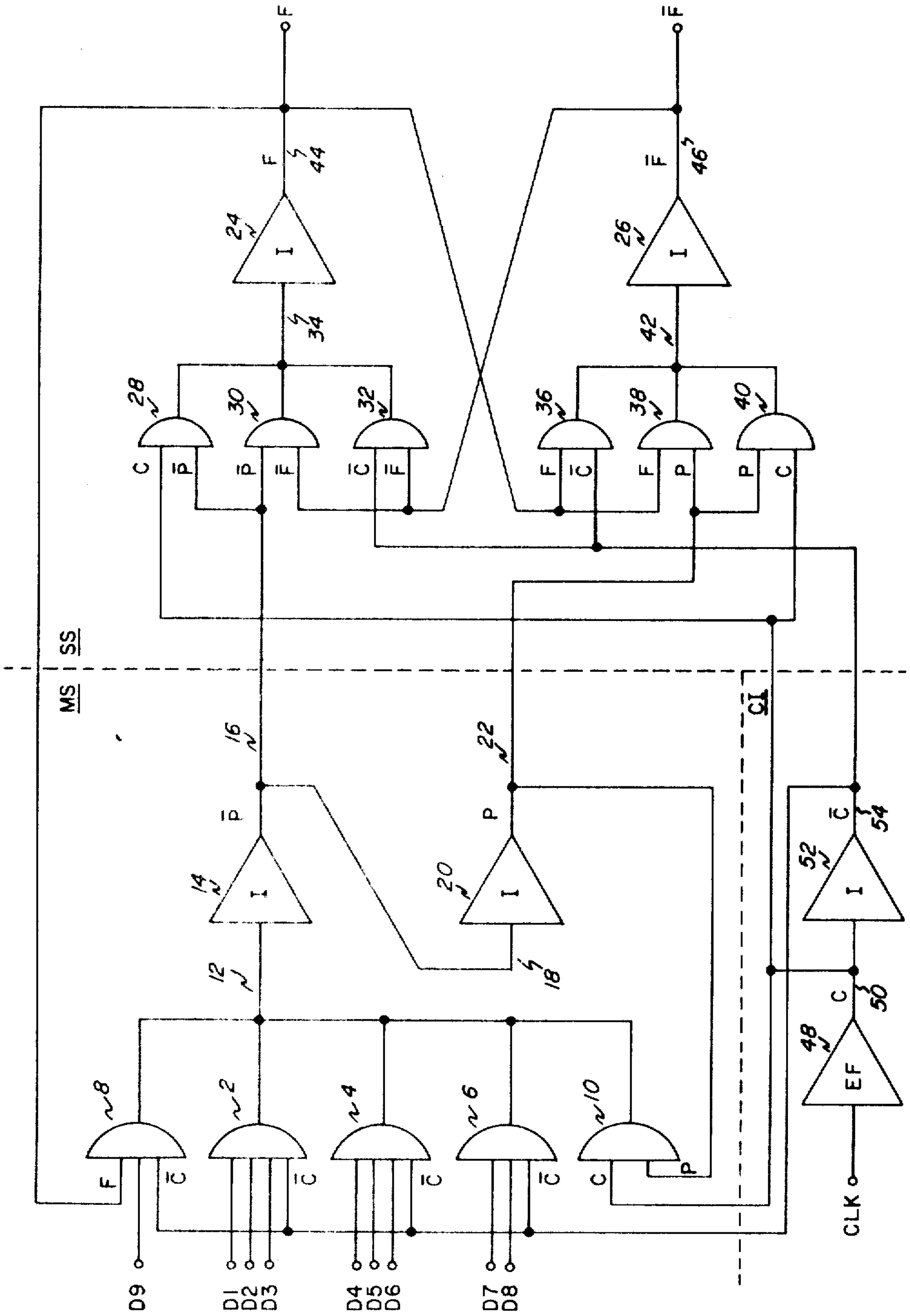
FIGURE 1 illustrates the present invention in logical diagram form.

Referring now to FIGURE 1 of the drawings, there is illustrated in logic diagram form a preferred embodiment of the present invention. A dual-rank flip-flop is illustrated which includes three interconnected functional sections, i.e. a master section MS, a slave section SS and a clock inverter section CI. The master section MS is shown to include data gates 2, 4 and 6, each having a specified number of data input terminals. It will be understood that the invention is limited neither to the number of gates so shown, nor to the number of input terminals illustrated for each. Further, there are shown a special data gate 8 and a recirculation gate 10, each having its output lead coupled to an input lead 12 of an inverter stage 14. An output lead 16 of inverter stage 14 is coupled to an input lead 18 of an inverter stage 20, the latter having an output lead 22 returned to one input of the recirculation gate 10. Reference letters $\overline{P}$ and P have been assigned to the inverter output leads 16 and 22, which letters denote the logic signals formed thereon. The recirculation gate 10 has a second input lead which receives clocking signals C generated within the clock inverter section CI of the flip-flop.

Each of the data gates 2, 4, 6 and 8 has an input lead which receives complementary clock signals, designated $\overline{C}$, which are generated within the clock inverter section of the flip-flop. The data gate 2 is illustrated with three additional input leads which are connected to the data input terminals D1, D2 and D3 respectively. Similarly, the data gate 4 has three input leads connected to the data input terminals D4, D5 and D6 respectively while the data gate 6 is shown with two additional input leads connected to the data input terminals D7 and D8. The special data gate 8 has two additional input leads, one of which is connected to a data input terminal D9. In the illustrated example, the other input lead is shown connected to receive logic signals F formed within the slave section of the flip-flop.

The slave section SS includes a pair of complementary-operated inverter stages 24 and 26, each having three dual-input gates connected thereto. Thus, a transfer gate 28, an overlap gate 30 and a hold gate 32 each have an output lead connected to an input lead 34 of inverter stage 24. Similarly, a hold gate 36, an overlap gate 38 and a transfer gate 40 each have an output lead connected to an input lead 42 of inverter stage 26. The output leads 44 and 46 of inverter stages 24 and 26 are connected to output terminals F and $\overline{F}$ respectively. In addition, the output lead 44 is connected to one input lead of the hold gate 36, to one input lead of the overlap gate 38 and to the aforementioned input lead of special data gate 8, while the output lead 46 is connected to one input lead of the overlap gate 30 and to one input lead of the hold gate 32.

The output lead 16 of inverter stage 14, bearing logic signals $\overline{P}$ is coupled to one input lead of the transfer gate 28 and to the other input lead of the overlap gate 30. Similarly, the output lead 22 of inverter stage 20, bearing the logic signals P, is connected to one input lead of the transfer gate 40 and to the other input lead of the overlap gate 38. The other input lead of the transfer gates 28 and 40 receives a source of clock signals C generated within the clock inverter section, while the other input lead of the hold gates 32 and 36 receives a source of complementary clock signals $\overline{C}$, also generated within the clock inverter section of the flip-flop.

The clock inverter section of the flip-flop includes an emitter-follower stage 48 having an input lead connected to a clock signal input terminal CLK and an output lead 50, bearing the clock signals C, connected to the input of an inverter stage 52. As previously mentioned, the clock signal C is further coupled to the clock signal input lead of each of gates 10, 28 and 40. An output lead 54 of inverted 52, bearing the complementary clock signals $\overline{C}$, is connected to the complementary clock signal input lead of the gates 2, 4, 6, 8, 32 and 36.

The operation of the preferred logical embodiment of the present invention illustrated in FIGURE 1 will now be described with respect to high and low level logic signals applied to the data input terminals D7 and D8 of the data gate 6. It is assumed in the example under consideration that the remaining data gates 2, 4 and 8 have a low level logic signal applied to one or more of their respective data input terminals. Since each of the remaining data gates 2, 4 and 8 also provide the logical AND function of high-level data signals applied thereto, it is clear that they would similarly effect the operation of the flip-flop.

Figure 2:
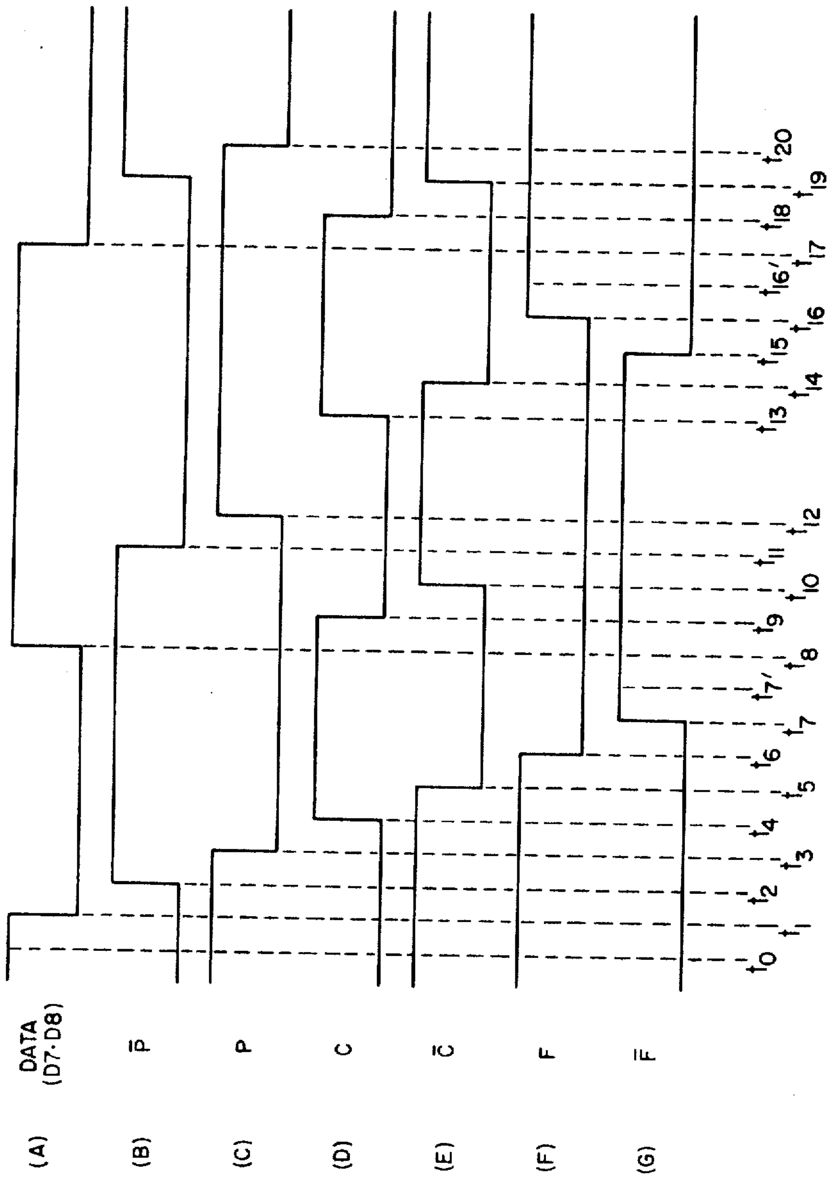
FIGURE 2 illustrates a series of logic waveforms which are helpful in forming an understanding of the operation of the present invention.

In order to best understand the operation of the invention, reference should be made to the logic waveforms of FIGURE 2. The waveform of FIGURE 2A, for example, represents the logical AND resultant of the data signals applied to input terminals D7 and D8, and is shown to be high when the data signals D7 and D8 are simultaneously high, as at time $t_0$. If either or both of the logic signals are low, the waveform of FIGURE 2A is low, as observed during the time interval $t_1$–$t_8$. FIGURES 2B and 2C illustrate the logic signals $\overline{P}$ and P, formed on the leads 16 and 22 respectively. FIGURES 2D and 2E illustrate the clock signal waveform C and the complementary clock signal waveform $\overline{C}$, formed on the leads 50 and 54 respectively, while FIGURES 2F and 2G represent the logic signals F and $\overline{F}$, as formed on the leads 44 and 46 respectively and the like-referenced output terminals of the flip-flop.

At time $t_0$, it will be assumed that the master section of the flip-flop has been preset to a state wherein the inverter stage 14 is conducting and the inverter stage 20 is non-conducting. Hence, $\overline{P}$ will be low at time $t_0$, as illustrated in FIGURE 2B and P will be high, as illustrated in FIGURE 2C. The inverter stage 24 will be assumed to be non-conducting and the inverter stage 26 conducting at time $t_0$. Hence, F is high and $\overline{F}$ low, as illustrated by the waveforms of FIGURES 2F and 2G respectively.

At time $t_1$, one or both of the logic signals applied to the input terminals D7 and D8 of data gate 6 is assumed to go low. When this occurs, the inverter stage 14 will switch to its non-conductive condition during the time intervals $t_1$–$t_2$. Thus, at time $t_2$, $\overline{P}$ will be high to provide an energizing signal at the input of inverter stage 20. During the time interval $t_2$–$t_3$, inverter stage 20 becomes conductive whereupon its output signal P is low at time $t_3$. Since the inverter stages 14 and 20 are lightly loaded and are not subjected to substantial values of load capacitance, the time interval $t_1$–$t_3$, wherein the inverters 14 and 20 assume their complementary conductive conditions, is short in comparison to the switching time for a single inverter stage of the slave section. Therefore, the sequential switching of the master section inverter stages does not limit the operational speed of the flip-flop.

At time $t_4$, the clock signal C goes high. Since $\overline{P}$ is also high at this time, as noted from FIGURE 2B transfer gate 28 will be enabled to provide a high-level logic signal at the input lead 34 of inverter stage 24. The inverter stage 24 will switch to its conductive state during the time interval $t_4$–$t_6$, whereby F is low at time $t_6$. As previously mentioned, the inverter stages 24 and 26, being heavily loaded, require a substantially longer time than the inverter stages 14 and 20 to change conductive states.

In conventional dual-rank flip-flop circuits, it is necessary to await the completion of the switching of the first inverter stage of the slave section to obtain a regenerative feedback signal capable of initiating the switching of the second inverter stage. Thus, in such a circuit, the second inverter stage 26 would not have received a low-level de-energizing signal F until the time $t_6$ and would not have completed its switching until a much later time $t_7'$. In the present invention, when the clock signal C goes high at time $t_4$, it initiates the switching action of inverter 52 to provide a low-level complementary clock signal $\overline{C}$ a short time thereafter, at time $t_5$. When complementary clock signal $\overline{C}$ goes low at time $t_5$, it disables hold gate 36 to initiate the switching action of inverter stage 26. The inverter stage 26 will switch to a non-conductive condition during the time interval $t_5$–$t_7$ to provide a high level signal $\overline{F}$ at time $t_7$. Thus, the switching of the slave section of the flip-flop is completed at time $t_7$, rather than at a later time $t_7'$, resulting in a marked increase in permissible speed of operation of the flip-flop.

At time $t_8$, it is assumed that the logic signals are again simultaneously high at the data input terminals D7 and D8 of data gate 6. Thus, the composite data signal illustrated in FIGURE 2A is seen to go high at this time. Since the complementary clock signal $\overline{C}$ is low at time $t_8$, the master section of the flip-flop is inhibited from responding to this change of input data. At time $t_9$, the clock signal C goes low to disable the transfer gates 28 and 40 and inhibit the transfer of data to the slave section of the flip-flop. At time $t_{10}$, the complementary check signal $\overline{C}$ goes high initiating the switching of inverter 14 whereby $\overline{P}$ is low at time $t_{11}$. Inverter stage 20 will be rendered non-conductive during the time interval $t_{11}$—$t_{12}$ causing P to go high at time $t_{12}$.

It will be noted that during the time $t_9$–$t_{10}$, both C and $\overline{C}$ are low. This is the case since a time is required after C goes low, to render the clock inverter stage 52 non-conductive and permit $\overline{C}$ to go high. Consequently, the hold gates 32 and 36 are disabled during the time $t_9$–$t_{10}$ and can no longer transmit the regenerative feedback signals necessary to sustain the slave section in its pre-established state. Previous attempts to solve this potential race condition have failed and as a result, it has been necessary to be content with dual-rank flip-flop circuits having sequentially operated slave inverters, or dual-rank flip-flop circuits which require a complex clocking system, each being comparatively slow in operation. The present invention resolves this potential race problem by the action of the overlap gates 30 and 38. Note that during the time interval $t_9$–$t_{10}$, $\overline{P}$ and $\overline{F}$ are high. Thus, overlap gate 30 will be enabled so as to sustain the slave section in its previously established state.

At time $t_{13}$, the clock signal C goes high and, since P is also high, transfer gate 40 will be enabled to initiate the switching of inverter stage 26. During the time $t_{13}$–$t_{15}$, inverter stage 26 becomes conductive causing $\overline{F}$ to go low at time $t_{15}$. At time $t_{14}$, $\overline{C}$ goes low to disable the hold gate 32 and initiate the switching of inverter stage 24. The inverter stage 24 will become non-conductive during the time $t_{14}$–$t_{16}$ causing F to go high at time $t_{16}$. Here again, the present invention permits the switching of inverter 24 to commence at time $t_{14}$ and to be completed at time $t_{16}$. By comparison, prior art circuits were forced to await the formation of a low $\overline{F}$ signal at time $t_{15}$ so that the switching operation could be completed only at a later time $t_{16}'$.

At time $t_{17}$ one or both of the data input signals applied to the data input terminals D7 and D8 is assumed to go low. Since C and P are both high, recirculation gate 10 is enabled to sustain the logic signals $\overline{P}$ and P low and high respectively. At time $t_{18}$, clock signal C goes low to disable the recirculation gate 10 whereupon $\overline{P}$ will be high at time $t_{19}$ and P will be low at time $t_{20}$. During the time $t_{18}$–$t_{19}$, when C and $\overline{C}$ are both low, overlap gate 38 is enabled by the logic signals P and F to sustain the preestablished stable state within the slave section and thus avoids a potential race condition.

In order for the overlap gate 38 to be effective, it is essential that $\overline{C}$ be high before P goes low. In the present invention, this condition is guaranteed by causing the turn-off of the recirculation gate 10 to be delayed by means of novel gate circuitry described below in connection with FIGURE 3. By delaying the turn-off of recirculation gate 10, the time at which $\overline{P}$ goes high is delayed. Accordingly, the time at which P goes low will assuredly occur after the time when $\overline{C}$ goes high.

While it may be connected like gates 2, 4 or 6 respectively, in the example under consideration, the special data gate 8 is illustrated with the generated logic signal F applied to one of its inputs. Thus, whenever the logic signal applied to the input terminal D9 is at its high level, the flip-flop, once set to the state wherein F is high and $\overline{F}$ is low, will be thereafter sustained in that state. This holding feature is often required for logic purposes. While not illustrated in the preferred embodiment of the invention, it is also possible for the flip-flop to be arranged to perform a complementing action during each clocking cycle. This is accomplished by returning the logic signal $\overline{F}$, rather than the signal F to the special data gate 8.

From the foregoing discussion, it will be apparent that the dual-rank flip-flop circuit of the present invention possesses many desirable characteristics heretofore not found together in such devices. The circuit is inexpensive to construct, being comprised of a small number of logic elements. The asymmetrical construction of the circuit permits it to be opearted with a minimum number of data gates and data input signals. In addition, the synchronizing, or clocking pulses for the flip-flop are derived from a single-phase clocking source. The unique gating structure associated with the slave section of the flip-flop permits the simultaneous switching of its complementary-operated inverter switches. Consequently, the operational speed of the flip-flop is greatly increased. Further, the aforementioned unique gating structure assuredly prevents the formation of a race condition within the flip-flop, even at its increased operational speed.

Figure 3:
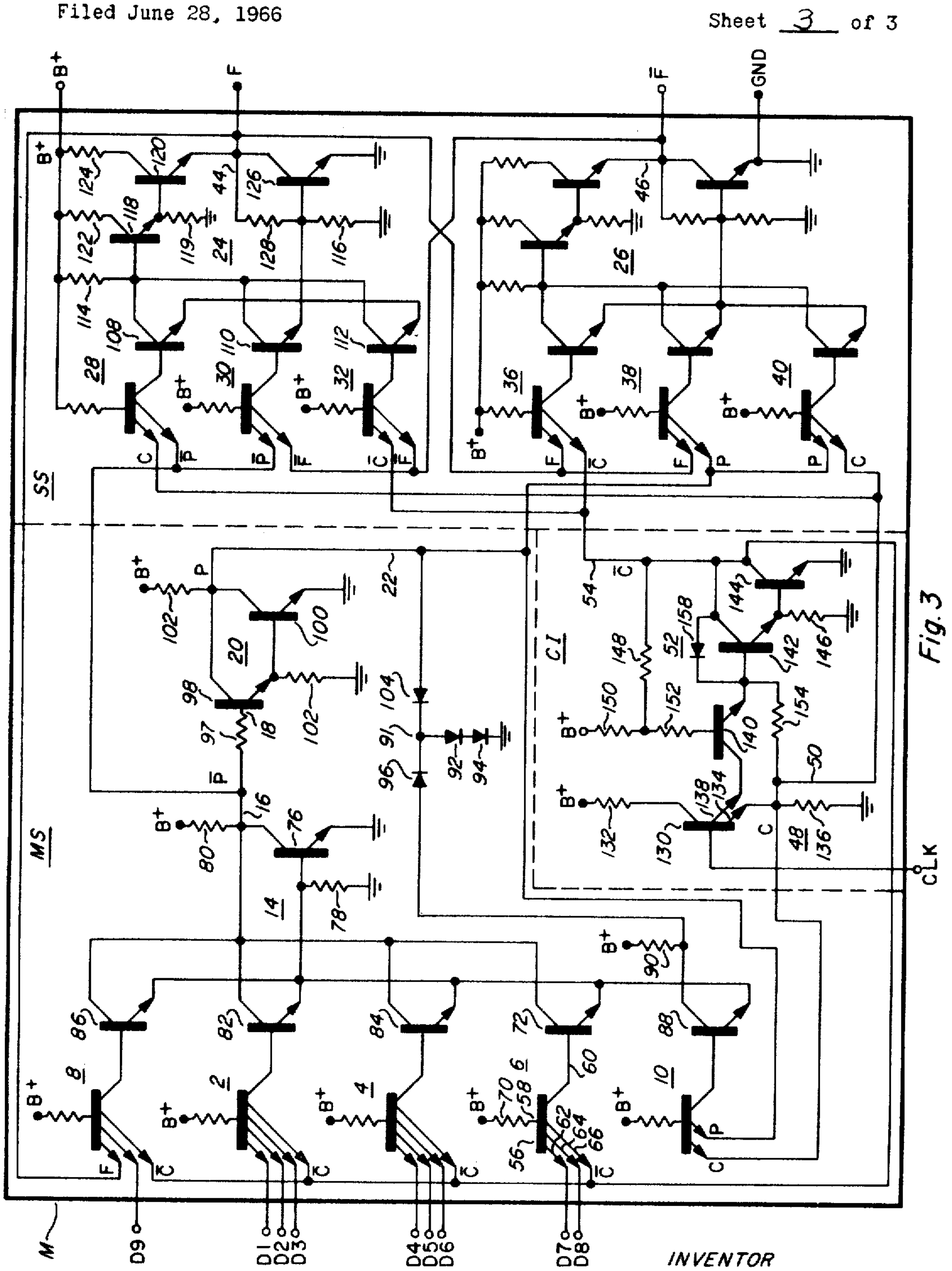
FIGURE 3 is a schematic circuit diagram of a preferred embodiment of the present invention.

FIGURE 3 of the drawings schematically illustrates a preferred embodiment of the present invention in the form of a monolithic circuit wherein a master section MS, a slave section SS and a clock inverter section CI are constructed on a single wafer of semi-conductor material. The terminals, leads, signals and circuit sections which are analogous to those shown in FIGURE 1 are labeled with the same reference indicia. The data input gates 2, 4 and 6, special data gate 8, and recirculation gate 10 are similar in construction and in operation and hence only the structure and operation of data gate 6 will be described here in detail. The data gate 6 consists of a multiple-emitter transistor 56 having a base 58, a collector 60 and three separate emitters 62, 64 and 66. Such multiple-emitter transistors are well-known and are readily fabricated in monolithic form. The emitters 62 and 64 of transistor 56 are connected to the data input terminals D7 and D8 respectively of the micro-electronic package M, while the emitter 66 receives complementary clock signals $\overline{C}$ from the clock inverter section of the flip-flop. The base 58 of transistor 56 is coupled to a positive biasing potential terminal B+ by means of a resistor 70. The collector 60 of transistor 56 is connected to the base of a transistor 72 which, together with a transistor 76 forms an inverter stage 14 connected as a Darlington circuit. Thus, the emitter of transistor 72 is connected to the base of transistor 76 and is coupled to a ground terminal GND by means of a resistor 78. The collector of transistor 72 is connected to the collector of transistor 76, the latter having its collector returned to the aforementioned B+ terminal by means of a collector resistor 80 and its emitter connected to ground. Logic signals $\overline{P}$ are formed on the output lead 16 connected to the collector of transistor 76.

The remaining data gates 2, 4 and 8 have the collector lead of their respective multiple-emitter gate transistors connected to the base of transistors 82, 84 and 86 respectively. The collector and emitter elements of transistors 82, 84 and 86 are joined to the like elements of transistor 72 whereby each gate circuit is provided with a separate input transistor for the inverter stage 14. The connection of the recirculation gate 10 to the inverter stage 14 differs from that of the data gates in that the collector of its multiple-emitter transistor is connected to the base of a transistor 88 whose collector is returned to B+ by means of a resistor 90. The emitter of transistor 88 is connected to the base of transistor 76 as in the case of the data gate circuits.

As previousy stated, it is desired that the recirculation gate 10 have a slow turn-off time to ensure that the logic signal P does not go low before $\overline{C}$ goes high. To accomplish this, its transistor 88 is connected as a phase-splitter circuit. As such, the transistor 88 will be permitted to saturate when rendered conductive, thus increasing its deenergization time and delaying the time at which logic signals $\overline{P}$ and P will go high and low respectively. To limit the positive voltage appearing on the collector of transistor 88, the latter is connected to a junction 91 of a pair of series-connected clamp diodes 92 and 94 by means of an isolation diode 96. The maximum high-level voltage appearing on the collector of transistor 88 will therefore be the combined voltage drop across the diodes 92, 94 and 96.

The output lead 16 of inverter stage 14 is coupled, by way of a resistor 97, to the base of a transistor 98 which, together with a transistor 100, forms the Darlington-connected inverter stage 20. Thus, the emitter of transistor 98 is connected to the base of transistor 100 and is coupled to ground by way of a resistor 102. The emitter of transistor 100 is connected to ground while the collectors of transistors 98 and 100 are returned to the B+ terminal by way of the common collector resistor 102. A lead 22 connected to the collector of transistor 100 serves as the output lead of inverter stage 20 and is connected to the anode of an isolation diode 104 whose cathode is connected to the junction 91 of the isolation diode 96 and the anode of the series-connected clamp diodes 92 and 94. The output lead 22 of inverter 20 has logic signals P formed thereon which are coupled to like-referenced leads within the flip-flop.

The operation of the master section of the flip-flop will be described with reference to logic signals applied to the input terminals D7 and D8 of data gate 6. It will be initially assumed that low-level logic signals, i.e. signals approaching ground potential, are applied to one or both of the terminals D7 and D8. Transistor 56 will be conductive in one or both of its base-emitter junctions 58–62 and 58–64, causing its collector 60 to be low, or at a voltage level approximating ground potential. Transistors 72 and 76 will be rendered non-conductive, thus providing a high level logic signal $\overline{P}$ on the output lead 16 of inverter stage 14. Transistors 98 and 100 will be rendered conductive causing a low level logic signal P to appear on the output lead 22.

If high-level logic signals, i.e. signals having a prescribed positive value, are simultaneously applied to the data input terminals D7 and D8 of data gate 6, its collector 60 will go positive causing the transistors 72 and 75 to conduct. The output lead 16 of inverter stage 14 will have a low-level logic signal $\overline{P}$ formed thereon, thus causing the transistors 98 and 100 of inverter stage 20 to become non-conductive to provide a high-level logic signal P on the output lead 22. The high level of the logic signal P will be limited by the combined voltage drop across the isolation diode 104 and clamp diodes 92 and 94 to a predetermined voltage.

The slave section of the flip-flop includes the aforementioned input gates 28, 30, 32, 36, 38 and 42. Each of these gates are formed with multiple-emitter transistors and operate in the same manner as that described with reference to the gate 6 in the master section of the flip-flop. Since the complementary halves of the slave section of the flip-flop are identical, only the construction and operation of the inverter 24 and its related gate circuits 28, 30 and 32 is described here in detail. The collector leads of the multiple-emitter transfer gate 28, overlap gate 30 and hold gate 32 are connected to the base leads of phase-splitter transistors 108, 110 and 112 respectively whose joined collector leads are coupled to the B+ terminal by way of a resistor 114 and connected to the base of an emitter-follower transistor 118. The emitter of transistor 118 is coupled to ground via a resistor 119 and is further connected to the base of a cascaded emitter-follower transistor 120, the latter having its emitter connected to the output lead 44 and the output terminal F of the flip-flop. The collectors of transistors 118 and 120 are returned to B+ potential by way of their collector resistors 112 and 124 respectively. The joined emitters of transistors 108, 110 and 112 are connected to the base of a transistor switch 126 whose emitter is connected to ground and whose collector is connected to the output lead 44 of inverter stage 24 and to the output terminal F. A feedback resistor 128 is connected between the collector and base elements of transistor 126.

In operation, if one or more of the gates 28, 30 and 32 is enabled by the presence of positive, i.e. high-level, logic signals at each of its input terminals, its respective phase-splitter transistor 108, 110 or 112 will become conductive. The joined collectors of transistors 108, 110 and 112 will therefore go negative towards ground potential. The emitter-follower transistors 118 and 120 will be rendered non-conductive to effectively decouple the output lead 44 from the B+ terminal. At the same time, the joined emitters of transistors 108, 110 and 112 will go positive to activate transistor switch 126. The conduction of transistor 126 will clamp the output lead 44 at approximately ground potential to provide a low-level logic signal at the output terminal F.

If, on the other hand, each of the data gates 28, 30 and 32 is disabled by the presence of a low-level signal on one or more of their respective input leads, the associated phase-splitter transistors 108, 110 and 112 will be rendered non-conductive. The voltage at the joined collectors of transistors 108, 110 and 112 will go positive to energize transistors 118 and 120 whereby the output lead 44 will go positive towards B+ potential to provide a high-level logic signal at the output terminal F of the flip-flop. When the phase-splitter transistors are non-conductive, the transistor switch 126 will be rendered non-conductive to disconnect the output lead 44 from ground. The feedback resistor 128 limits the high level of logic signal F and provides a noise threshold voltage at the joined emitters of transistors 108, 110 and 112 which must be overcome before the logic signal F will be permitted to go low.

The clock inverter section CI includes a multiple-emitter transistor 130 which is analogous to the emitter-follower stage 48 of FIGURE 1. Transistor 130 has its base lead connected to the external clock signal input terminal CLK of the microelectronic package M, and its collector returned to B+ via a resistor 132. An emitter 134 of transistor 130 is coupled to ground by a resistor 136 and provides clock signals C on its output lead 50. An emitter 138 of transistor 130 is connected to the collector of a transistor switch 140, the latter having its emitter connected to the base of transistor 142 which, together with a transistor 144 forms the Darlington-connected inverter stage 52. Thus, the emitter of transistor 142 is connected to the base of transistor 144 and is coupled to ground by the resistor 146. The emitter of transistor 144 is connected to ground while the joined collectors of transistors 142 and 144 are coupled to the aforementioned B+ terminals via series-connected resistors 148 and 150, and provide complementary clock signals $\overline{C}$ on the output lead 54. The junction of resistors 148 and 150 is coupled to the base of transistor switch 140 via a resistor 152. A resistor 154 connects the emitter 134 of transistor 130 with the base of transistor 142.

In operation, when the externally applied clock signal CLK is low, i.e. at approximately ground potential, transistor 130 will be non-conductive and the clock signal C will be low. Transistor 140 will be conductive in its base-emitter junction and will provide a current therethrough, which together with the current through the feedback diode 158, forward biases the base-emitter junctions of transistors 142 and 144. As a result, transistors 142 and 144 will conduct causing their joined collectors to go negative from B+ potential. The voltage at the joined collectors of transistors 142 and 144 will settle at a voltage equal to the base-emitter voltage drops across the transistors 142 and 144 plus the voltage drop across feedback diode 158. Thus, the logic signal $\overline{C}$ is sustained at a prescribed high-level value.

When the external clock signal applied to the base of transistor 130 goes high, transistor 130 will conduct to provide a high level clock signal C. Since transistor 140 is conducting at this time, the high level clock signal also formed at the emitter 138 of transistor 130 will provide a surge of additional current through the base-emitter junctions of transistors 142 and 144 to quickly render them fully conductive. Logic signal $\overline{C}$ will rapidly assume its low value. As $\overline{C}$ goes negative towards its low value, transistor 140 becomes non-conductive thus reducing the average power dissipation within the circuit. The transistors 142 and 144 are thereafter sustained in their fully conductive condition by the current flow through resistor 154. Thus, the clock inverter circuit CI advantageously provides a means for rapidly forming the low-level of the complementary clock signal $\overline{C}$ without a resultant high average power dissipation with the circuit.

The preferred logic embodiment of the invention illustrated in FIGURE 1 has been constructed with discrete circuit components, and also in the monolithic circuit form illustrated in FIGURE 3 of the drawings. In each instance, the circuit has proven to be reliable in operation at clocking cycles in excess of 40 megacycles per second.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. A dual-rank flip-flop having bistable master and slave data storage sections and a clock inverter section, said clock inverter section being adapted to provide alternately occurring clock and complementary clock pulses, means for applying data signals to said master section, said master section including first and second cross-coupled inverter stages and being adapted in the presence of said complementary clock pulses to assume a stable state prescribed by said data signals, said slave section including third and fourth inverter stages, a pair of hold gates cross-coupling said third and fourth inverter stages and being adapted in the presence of said complementary clock pulses to sustain said slave section in its previously established stable state, a pair of transfer gates coupling said first and second inverter stages to said third and fourth inverter stages respectively and being adapted in the presence of said clock pulses to force a stable state in said slave section determined by said prescribed stable state of said master section, and a pair of overlap gates coupling said first and second inverter stages to said third and fourth inverter stages respectively and further cross-coupling said third and fourth inverter stages, said overlap gates being adapted to sustain said slave section in said forced stable state in the absence of said clock and complementary clock pulses.

2. The apparatus of claim 1 wherein said cross-coupling in said master section includes a recirculation gate coupled between the output and input of said second and first inverter stages respectively and further connected to receive said clock pulses, said recirculation gate being adapted in the presence of said clock pulses to sustain said prescribed state of said master section.

3. The apparatus of claim 1 wherein said flip-flop is constructed in monolithic form on a semiconductor wafer having a predetermined number of associated ter minals, said means for applying data signals to said master section comprising a plurality of data gates on said wafer each having at least one input connected to one of said terminals, the outputs of said gates being jointly buffered to the input of said first inverter stage.

4. The apparatus of claim 3 and further including means internal to said wafer for coupling the output of one of said third and fourth inverter stages to an input of one of said plurality of data gates.

5. A flip-flop having bistable master and slave sections, said master section including first and second cross-coupled inverter stages and being adapted to assume a prescribed stable state during a first time interval of an operational cycle of said flip-flop, said slave section including third and fourth inverter stages, a pair of hold gating means cross-coupling said third and fourth inverter stages and being adapted to sustain said slave section in its previously established stable state during said first time interval, a pair of transfer gating means coupling said first and second inverter stages to said third and fourth inverter stages respectively and being adapted to force said slave section to a stable state determined by said prescribed stable state during a second time interval of said operational cycle, and a pair of overlap gating means coupling said first and second inverter stages to said third and fourth inverter stages respectively and cross-coupling said third and fourth inverter stages, said overlap gating means being adapted to sustain said slave section in said forced stable state intermediate said first and second time intervals.

6. A dual-rank flip-flop including bistable first and second data storage sections, means for applying alternately occuring first and second timing pulses to said flip-flop, means for applying data signals to said first data storage section, said first data storage section including first and second cross-coupled switching stages and being responsive to said first timing pulses to assume a stable state in accordance with said data signals, said second data storage section including third and fourth switching stages, hold gating means cross-coupling said third and fourth switching stages and being responsive to said first timing pulses to sustain said second storage section in its previously established stable state, transfer gating means coupling said first and second switching stages to said third and fourth switching stages respectively and being responsive to said second timing puplses to force in said second storage section a stable state determined by the stable state of said first storage section, and overlap gating means coupling said first and second switching stages to said third and fourth switching stages respectively and further cross-coupling said third and fourth switching stages, said overlap gating means being adapted to sustain said second storage section in said forced stable state in the absence of said first and second timing pulses.

7. Data processing apparatus including first and second data storage sections, means for receiving first and second timing pulses, said first data storage section including bistable switching means adapted to assume a new stable state during the occurrence of said first timing pulses, said second data storage section comprising bistable switching means including first, second and third gating means, said first gating means being adapted to sustain said second data storage section in its previously established stable state during the occurrence of said first timing pulses, said second gating means being adapted to force in said second data storage section a stable state related to that of said first data storage section during the occurrence of said second timing pulses, and said third gating means being adapted to sustain said second data storage section in said forced stable state in the absence of said first and second timing pulses.

8. Data processing apparatus including first and second data storage sections, said first data storage section including bistable switching means adapted to assume a new stable state during a first time interval, said second data storage section comprising bistable switching means including first, second and third gating means, said first gating means being adapted to sustain said second data storage section in its previously established stable state during said first time interval, said second gating means being adapted to force in said second data storage section a stable state related to that of said first data storage section during a second time interval, and said third gating means being adapted to sustain said second data storage section in said forced stable state intermediate said first and second time intervals.

9. A dual-rank flip-flop comprising first and second inverter stages each having an input and an output, a plurality of data gates and a recirculation gate each having a plurality of inputs and each further having an output coupled to the input of said first inverter stage, means for coupling data signals to said inputs of said data gates, means connecting the output of said first inverter stage to the input of said second inverter stage, means connecting the output of said second inverter stage to one input of said recirculation gate, means for receiving clock signals, means for coupling said clock signals to another input of said recirculation gate, clock inverter means connected to receive said clock signals and adapted to provide complementary clock signals, means for coupling said complimentary clock signals to one input of each of said data gates, a third inverter stage, a first hold gate, a first transfer gate and a first overlap gate coupled to the input of said third inverter stage, a fourth inverter stage, a second hold gate, a second transfer gate and a second overlap gate coupled to the input of said fourth inverter stage, means coupling the output of said first inverter stage to one input of said second hold gate and of said second overlap gate, means coupling the output of said fourth inverter stage to one input of said first hold gate and of said first overlap gate, means for coupling the output of said first inverter stage to one input of said first transfer gate and to another input of said first overlap gate, means coupling the output of said second inverter stage to one input of said second transfer gate and to another input of said second overlap gate, means coupling said clock signals to another input of each of said first and second transfer gates, means coupling said complementary clock signals to another input of each of said first and second hold gates, and means for deriving a pair of complementary output signals from the outputs of said third and fourth inverter stages.

10. The apparatus of claim 9 and further including means for coupling the output of said third inverter stage to an input of one of said plurality of data gates.

References Cited

UNITED STATES PATENTS

| | | | |
|---|---|---|---|
| 3,042,815 | 7/1962 | Campbell | 307—291 |
| 3,247,399 | 4/1966 | Moody | 307—247 |
| 3,274,556 | 9/1966 | Paul et al. | 340—172.5 |

OTHER REFERENCES

Heilweil, M. F.: Double Register, in IBM Technical Disclosure Bulletin, 4(3): pp. 66–67, August 1961.

ROBERT C. BAILEY, *Primary Examiner.*

JOHN P. VANDENBURG, *Assistant Examiner.*

U.S. Cl. X.R.

307—247, 289